US011163279B2

(12) United States Patent
Ganapathy Ramalingam et al.

(10) Patent No.: US 11,163,279 B2
(45) Date of Patent: Nov. 2, 2021

(54) SENSOR BASED DATA SET METHOD AND APPARATUS

(71) Applicant: Intel Corporation, Santa Clara, CA (US)

(72) Inventors: Andal Jayalakshmi Ganapathy Ramalingam, Penang (MY); Rita Chattopadhyay, Chandler, AZ (US); Ravindra V. Narkhede, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 388 days.

(21) Appl. No.: 16/303,614

(22) PCT Filed: Jun. 30, 2016

(86) PCT No.: PCT/US2016/040533
§ 371 (c)(1),
(2) Date: Nov. 20, 2018

(87) PCT Pub. No.: WO2018/004623
PCT Pub. Date: Jan. 4, 2018

(65) Prior Publication Data
US 2020/0319611 A1 Oct. 8, 2020

(51) Int. Cl.
G05B 19/042 (2006.01)
F24F 11/63 (2018.01)
(Continued)

(52) U.S. Cl.
CPC ............ *G05B 19/042* (2013.01); *F24F 11/63* (2018.01); *G06F 11/3013* (2013.01);
(Continued)

(58) Field of Classification Search
CPC .............. G05B 19/042; G06F 11/3089; G06F 11/3013; G06F 17/14; G06F 2201/81; F24F 11/63
See application file for complete search history.

(56) References Cited

U.S. PATENT DOCUMENTS 6,535,783 B1* 3/2003 Miller ................. H01L 22/20
257/E21.525
2005/0165731 A1* 7/2005 Funk .................... G05B 15/02
(Continued)

FOREIGN PATENT DOCUMENTS

WO    WO2012-1060676 A1    8/2012

OTHER PUBLICATIONS

International Search Report and Written Opinion dated Mar. 30, 2017 for International Patent Application No. PCT/US2016/040533, 11 pages.

*Primary Examiner* — Vincent H Tran
(74) *Attorney, Agent, or Firm* — Schwabe, Williamson & Wyatt, P.C.

(57) ABSTRACT

Apparatus and method to facilitate automatic detection of a device state are disclosed herein. Selectively constraining a sensor based data set associated with one or more states of a device, wherein selectively constraining the sensor based data set includes analyzing a distribution of the sensor based data set to determine whether to constrain the sensor based data set, the sensor based data set including a first class and a second class of data values. Determining a threshold associated with the sensor based data set by selecting the threshold based on a variance between the first and second classes of the sensor based data set, wherein selecting the threshold includes using a constrained sensor based data set when the sensor based data set is determined to be con-
(Continued)

strained, and wherein the threshold indicates the data values associated with the first and second classes.

25 Claims, 12 Drawing Sheets

(51) Int. Cl.
  *G06F 11/30* (2006.01)
  *G06F 17/14* (2006.01)
(52) U.S. Cl.
  CPC .......... *G06F 11/3089* (2013.01); *G06F 17/14* (2013.01); *G06F 2201/81* (2013.01)

(56) References Cited

U.S. PATENT DOCUMENTS

| | | | |
|---|---|---|---|
| 2005/0209823 A1* | 9/2005 | Nguyen | G06K 9/00503 702/185 |
| 2006/0020416 A1* | 1/2006 | Karasek | B66B 1/3492 702/141 |
| 2007/0118047 A1 | 5/2007 | Tracey et al. | |
| 2007/0288166 A1 | 12/2007 | Ockerse et al. | |
| 2009/0204245 A1* | 8/2009 | Sustaeta | H04L 67/125 700/99 |
| 2009/0259340 A1* | 10/2009 | Umemoto | A61B 1/0051 700/275 |
| 2010/0030521 A1* | 2/2010 | Akhrarov | G06N 20/00 702/182 |
| 2010/0056938 A1* | 3/2010 | Pearlman | A61B 5/35 600/509 |
| 2011/0106418 A1 | 5/2011 | van der Merwe | |
| 2013/0060524 A1* | 3/2013 | Liao | G05B 23/0254 702/184 |
| 2014/0108020 A1 | 4/2014 | Sharma et al. | |
| 2014/0358465 A1* | 12/2014 | Shin | G05B 19/41875 702/82 |
| 2015/0051843 A1* | 2/2015 | Wang | H01J 49/0036 702/23 |
| 2015/0253768 A1* | 9/2015 | Meng | G05B 23/0251 702/33 |
| 2016/0187961 A1* | 6/2016 | Elibol | G06F 9/461 713/323 |
| 2016/0203036 A1* | 7/2016 | Mezic | G06F 11/079 714/819 |
| 2016/0290558 A1* | 10/2016 | Kuijpers | F16N 29/04 |

* cited by examiner

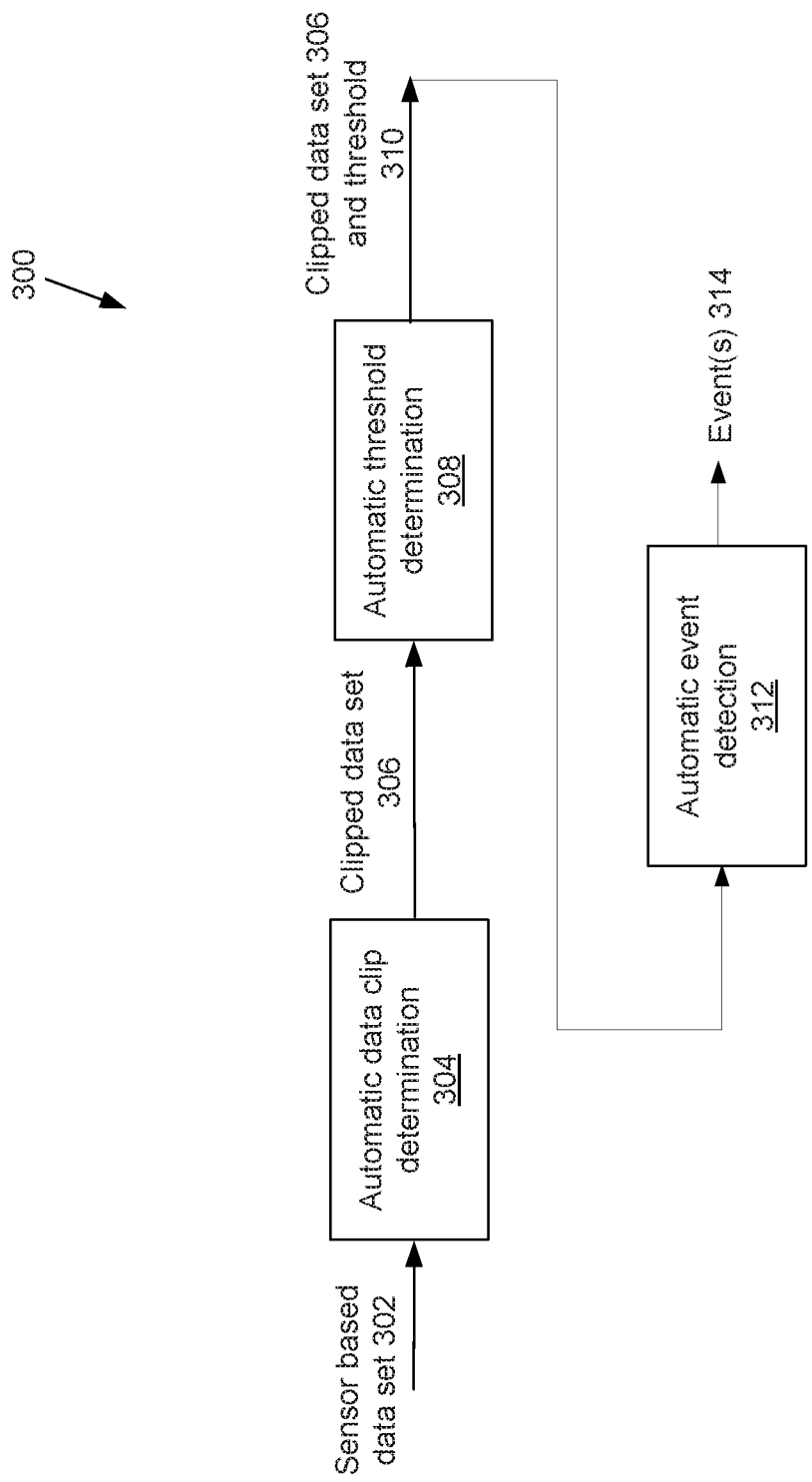

Non-transitory computer-readable storage medium
702

Programming Instructions 704
configured to cause a computer device, in response to execution of the programming instructions, to practice one or more operations of the methods described in reference to Figures 1-5.

FIG. 7

SENSOR BASED DATA SET METHOD AND APPARATUS

CROSS REFERENCE TO RELATED APPLICATIONS

The present application is a national phase entry under 35 U.S.C. § 371 of International Application No. PCT/US2016/040533, filed Jun. 30, 2016, entitled "SENSOR BASED DATA SET METHOD AND APPARATUS", which designated, among the various States, the United States of America. The entirety of the PCT/US2016/040533 Application is hereby incorporated by reference.

FIELD OF THE INVENTION

The present disclosure relates generally to the technical field of computing, and more particularly, to computing systems for processing and/or analyzing sensor data.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Data from sensors may provide a wealth of information. However, sensor data (also referred to as sensed data) may include one or more noise components due to environmental, operational, and/or inherent sources. For example, a sensor may be exposed to high temperature that results in thermal noise that may be included in data outputted from such a sensor. As another example, wear or tear on the sensor electronics, cables, connectors, and the like may be a source of noise in the sensed data. As still another example, the sensor itself may introduce noise into the sensed data. While it may be desirous to remove unwanted components from the sensed data, such as noise, separating the signal of interest from the noise is not without difficulty. Among other things, identifying noise component(s) within the sensed data accurately, consistently, and/or quickly is challenging over many sets of sensed data, over time, and/or for a variety of sensors.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIG. 3 depicts an example process for automatic and adaptive event or state detection, according to some embodiments.

FIG. 7 illustrates an example non-transitory computer-readable storage media having instructions configured to practice all or selected ones of the operations associated with the processes described herein, according to some embodiments.

DETAILED DESCRIPTION

Figure 1:
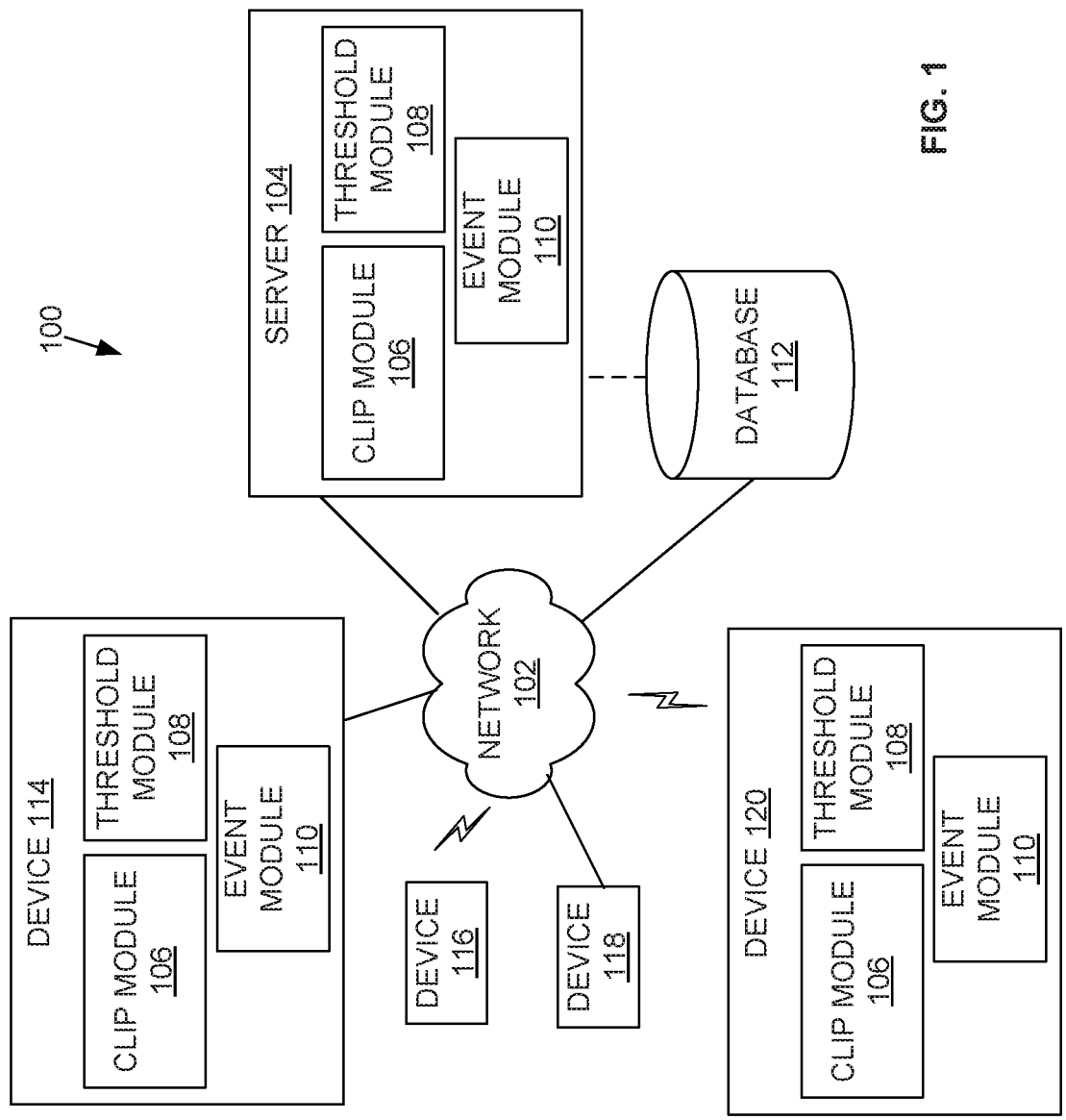
FIG. 1 depicts a block diagram illustrating a network view of an example system for practicing the present disclosure, according to some embodiments.

Embodiments of apparatuses and methods related to sensor based data set processing and analysis are described. In some embodiments, an apparatus may include one or more processors; and first and second modules to be executed by the one or more processors. The first module may selectively constrain a sensor based data set, wherein to selectively constrain the sensor based data set, the first module is to analyze a distribution of the sensor based data set to determine whether to constrain the sensor based data set, the sensor based data set associated with one or more states of a device and the sensor based data set including a first class and a second class of data values. The second module may determine a threshold associated with the sensor based data set, wherein to determine the threshold, the second module is to select the threshold based on a variance between the first and second classes of the sensor based data set, wherein the second module is to select the threshold using a constrained sensor based data set when the first module determines that the sensor based data set is to be constrained, and wherein the threshold indicates the data values associated with the first and second classes. These and other aspects of the present disclosure will be more fully described below In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating a network view of an example system 100 for practicing the present disclosure, according to some embodiments. System 100 may include a network 102, a server 104, a database 112, and devices 114-120. Each of the server 104, database 112, and devices 114-120 may communicate with the network 102.

Network 102 may comprise one or more wired and/or wireless communications networks. Network 102 may include one or more network elements (not shown) to physically and/or logically connect computer devices to exchange data with each other. In some embodiments, network 102 may be the Internet, a wide area network (WAN), a personal area network (PAN), a local area network (LAN), a campus area network (CAN), a metropolitan area network (MAN), a virtual local area network (VLAN), a cellular network, a WiFi network, a WiMax network, and/or the like. Additionally, in some embodiments, network 102 may be a private, public, and/or secure network, which may be used by a single entity (e.g., a business, school, government agency, household, person, and the like). Although not shown, network 102 may include, without limitation, servers, databases, switches, routers, gateways, base stations, repeaters, software, firmware, intermediating servers, and/or other components to facilitate communication.

Server 104 may comprise one or more computers, processors, or servers to perform the signal analysis and identification functionalities described herein. In some embodiments, server 104 may communicate with database 112 (directly or indirectly via network 102) and/or one or more of devices 114-120, via network 102. Server 104 may host one or more applications accessed by one or more of devices 114-120; provide processing functionalities for one or more of devices 114-120; provide data to one or more of devices 114-120; perform data clipping analysis, determination, and/or classification functionalities; perform threshold determination functionalities; perform processing of raw and/or refined data from sensors of devices 114-120; perform determination, classification, detection, and/or identification of events corresponding to data from sensors; facilitate access to and/or store information in the database 112; and the like. In some embodiments, server 104 may include one or more web servers, one or more application servers, one or more servers providing user interface (UI) or graphical user interface (GUI) functionalities, and the like.

Database 112 may comprise one or more storage devices to store data and/or instructions for use by devices 114-120 and/or server 104. The content of database 112 may be accessed via network 102 and/or directly by the server 104. The content of database 112 may be arranged in a structured format to facilitate selective retrieval. In some embodiments, the content of database 112 may include, without limitation, one or more pre-set values used for data analysis or processing (e.g., pre-set values 204 in FIG. 2), one or more event patterns used for event analysis or detection (e.g., event patterns 206 in FIG. 2), and the like. In some embodiments, database 112 may comprise more than one database, a first database including the pre-set values 204 and a second database including the event patterns 206.

Devices 114-120 may comprise machines, electrical machines, mechanical machines, electro-mechanical machines, a combination of one or more machines, or the like that may turn on or off and/or change among a plurality of states over time. Devices 114-120 may include one or more sensors (not shown) to capture data associated with the respective device turning on or off, changing from one state to another state (e.g., changing speed), one or more subcomponents of the respective device switching/turning on or off or changing state, and the like. Devices 114-120 may comprise heating, ventilating, and air conditioning (HVAC) systems, compressors, fans, humidifiers, dehumidifiers, condensers, freezers, refrigerators, refrigerant systems, air filtration systems, motors, generators, vehicles, transformers, power sources, and the like.

Devices 114-120 may also comprise wired and/or wireless communication computer devices (not shown) in communication with network 102. Devices 114-120 may comprise laptops, computers, work stations, smart phones, tablets, Internet of Things (IoT) devices, wearable devices, set top boxes, appliances, vehicles, cameras, microphones, image capture devices, audio capture devices, geographical location sensing devices, or any other types of devices that include at least a component (e.g., sensor) capable of capturing information about the device.

In some embodiments, each of devices 114-120 may generate sensor data associated with the respective device (also referred to as sensed data), and the sensor data, in turn, may be processed at the respective device and/or communicated over the network 102 to server 104 (in raw or processed form). For instance, a device of the devices 114-120 may convert the raw sensor data into refined or processed sensor data and send such refined sensor data to the server 104. As another example, a device of the devices 114-120 may perform data analysis on the sensor data to automatically and adaptively perform data clipping, determine a threshold to separate noise from the sensor data, and/or identify event(s) or state(s) associated with particular portions of the sensor data. If the sensor data is provided to the server 104 for processing, one or more results associated with the processed sensor data may be provided back to one or more of the devices 114-120. Devices 114-120 may be geographically distributed from each other and/or the network 102. Although four devices 114-120 are shown in FIG. 1, more or less than four devices may be included in the system 100.

In some embodiments, each of the devices 114-120 may be the same or different from one other. For example, device 114 may comprise a HVAC system model X made by company A, device 116 may comprise the same HVAC system made by the same company A as device 114, device 118 may comprise a refrigerant system model Y made by company B, and device 120 may comprise a HVAC system model Z made by company B. Device 114 may include modules 106-110, to be described in detail below, to perform one or more data analysis functionalities on the sensor data associated with device 114. While device 116 may include sensors to generate sensor data but may not include one or more of modules 106-110; thus, its sensor data may be communicated over network 102 to sever 104 for processing and/or analysis.

In some embodiments, server 104 and/or (some) devices 114-120 may include one or more of a clip module 106, a threshold module 108, and an event module 110. As described in detail below, clip module 106 may be configured to facilitate determination and processing of a set of sensor data so as to prevent generation of a potentially inaccurate threshold associated with the set of sensor data in a subsequent processing technique. Threshold module 108 may be configured to determine a threshold associated with a set of sensor data, which may be used to identify and separate noise components from the signal of interest in the set of sensor data. Event module 110 may be configured to analyze the signal of interest within the set of sensor data and determine one or more device events or states corresponding to the signal of interest (e.g., determine that the compressor within a HVAC system turned on at time 1 and turned off at time 2).

With respect to each of the devices 114-120, depending on computing requirements such as, but not limited to, processing capabilities, communication bandwidth and speed, computing architecture, application use and license model, data security, access to supplemental data, downstream data use, and the like, the functionalities of one, all, or part of one or all of the clip module 106, threshold module 108, and event module 110 may be performed by either the server 104 or respective device. For example, if a large volume of data is analyzed, server 104 may be better suited to perform such functions than any of devices 114-120. As another example, if a device of the devices 114-120 has limited processing capabilities, server 104 may be better suited to perform the processing functions. As still another example, if server 104 may be considered the "master" or "central hub" with respect to the devices 114-120, then server 104 may perform the processing functions because it has a need for and/or is better suited to use the events or states determined from the devices' sensor data. In still another example, server 104, as opposed to a plurality of devices 114-120, may be easier to maintain with the latest software, firmware, hardware, data, and the like, which may facilitate functionalities associated with the clip module 106, threshold module 108, and/or event module 110.

Although a single server 104 and database 112 are shown in FIG. 1, each of server 104 and database 112 may comprise two or more components and/or may be located at one or more geographically distributed location from each other. Alternatively, database 112 may be included within server 104. Furthermore, while system 100 shown in FIG. 1 employs a client-server architecture, embodiments of the present disclosure are not limited to such an architecture, and may equally well find application in, for example, a distributed or peer-to-peer architecture system.

Figure 2:
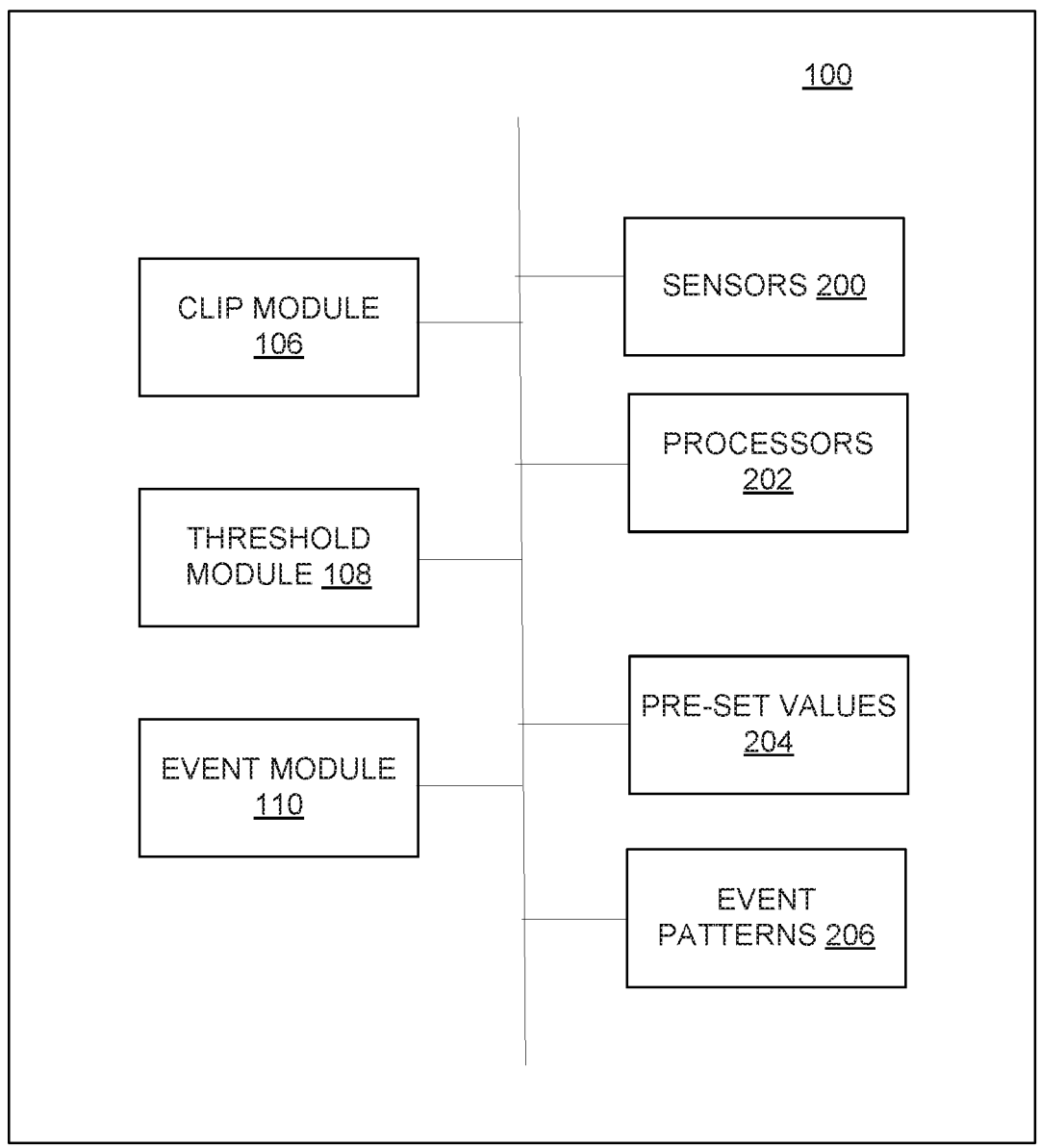
FIG. 2 depicts an example block diagram illustrating a logical view of the system of FIG. 1, according to some embodiments.

FIG. 2 depicts an example block diagram illustrating a logical view of the system 100, according to some embodiments. The system 100, as described earlier, may include sensors 200, processors 202, the clip module 106, the threshold module 108, and the event module 110. In some embodiments, sensors 200 may be integrated, attached, or coupled to devices 114-120. Sensors 200 may be capable of capturing information about one or more changes, actions, or state of its associated device. Sensors 200 may comprise, without limitation, a thermocouple, a temperature sensor, an accelerometer, a gyroscope, a barometric sensor, a motion sensor, an audio sensor, a visual sensor, a camera, an infrared sensor, a vibration sensor, a pressure sensor, a location sensor, a global positioning system (GPS), a radio detection and ranging (RADAR), a light radar (LIDAR), a photodetector, a current transformer, a voltmeter, a power meter, and the like.

Processors 202 may comprise one or more processors that are included in server 104, database 112, and/or devices 114-120. Each processor 202 may comprise one or more processor cores. In some embodiments, processors 202 may be capable of controlling the sensors 200; executing instructions to perform one or more of the functionalities disclosed herein; and/or the like. For example, processors 202 may execute instructions embodied in the clip module 106, threshold module 108, and/or event module 110. As another example, processors 202 may execute instructions to create, access, and/or maintain data in the database 112 such as pre-set values 204 and/or event patterns 206.

Clip module 106 may also be referred to as an automatic clipping engine or automatic clip value determination module. Threshold module 108 may also be referred to as a threshold determination module or an automatic and adaptive threshold determination module. Event module 110 may also be referred to as an event detection module, a device or machine state detection module, or the like. Clip module 106, threshold module 108, and event module 110 may comprise one or more software components, programs, applications, apps, or other units of code base or instructions configured to be executed by the processors 202. Modules 106, 108, and 110 may communicate with each other and access the pre-set values 204 and event patterns 206.

Although modules 106, 108, and 110 are shown as distinct modules in FIG. 2, these modules may be implemented as fewer or more modules than illustrated. The functionalities or instructions associated with a particular module may or may not be dedicated to the particular module, and may be executable on other processor(s) or compute resources, if available. For example, such other processor(s) or compute resources may be included in a massively connected network, in which one or more of the module functionalities or tasks may be performed on another platform and may be sent back to the main platform. Any of modules 106, 108, and 110 may also communicate with one or more components included in the system 100 and/or a massively connected network.

Clip module 106 may receive sensor based data associated with at least one of devices 114-120 in order to analyze the data distribution of the sensor based data and determine whether to constrain, clip, or otherwise modify the sensor based data so as to optimize the data for a threshold determination to be subsequently performed. In some embodiments, clip module 106 may determine, among other things, whether a difference in a means of certain of the top data values within the sensor based data and a means of noise (or signals not of interest) within the sensor based data exceeds a pre-set value (such as specified in the pre-set values 204). When the difference is exceeded, the clip module 106 may clip or constrain the maximum magnitude of data values within the sensor based data in accordance with the certain of the top data values. Accordingly, the sensor based data may be converted to clipped data. When the difference is not exceeded or a pre-cursor condition relating to a standard deviation associated with the certain of the top data values is not exceeded, then the sensor based data need not be clipped or constrained. And the clipped data associated with the sensor based data may be the same as the sensor based data.

Threshold module 108 may determine a threshold specifically applicable for or tailored to the sensor based data (or clipped data associated with the sensor based data, if it differs from the sensor based data) based on computations of between-class variances for each of a full range of potential threshold values t (e.g., t=0 to 15). In some embodiments, the range of potential threshold values may correspond to the range of data values of the clipped data. The sensor based data and clipped data include data or signals that may be classified as belonging to a first or second class, and between-class variances may comprise the extent of variances between the signals of the first and second classes. A particular potential threshold value t for which the between-class variance value is a maximum from among the between-class variance values for the full range of potential threshold values may comprise the final determined threshold. The threshold determination may also be based on identification of a particular potential threshold value t for which an in-class variance (e.g., variance within the first class or variance within the second class) is a minimum from among the in-class variances for the full range of potential threshold values. While the total variance of a given set of data values may be the same, threshold module 108 may be configured to compute and determine a particular potential threshold value t at which the intra-class/in-class variance may be minimized or the inter-class/between-class variance may be maximized.

Once the threshold has been determined, the event module 110 may perform one or more processing of the clipped data, as needed, prior to performing event detection. In some embodiments, each signal of interest included in the clipped data—those signals having a magnitude greater than the determined threshold value—may be analyzed to classify or identify an event or state that the respective signal may be indicating. Examples of detected event or state include, without limitation, an electrical event or state, an event or state of a subcomponent included in the device associated with the sensor based data (e.g., device 114), an outlier, a change, and the like. The detected event or state may identify a particular subcomponent from among the subcomponents included in the device and also the action taken by such subcomponent that caused a sensor of the sensors 200 to detect the signal, which is included in the sensor based data. For instance, the device may comprise a particular model of a HVAC unit located at a particular location, and a detected event or state may comprise compressor 1 from among compressors 1, 2, and 3 included in the HVAC unit switching off.

In some embodiments, data clipping and threshold determination may be performed in real time or near real time to acquisition of the sensor based data, while event detection may be performed at a later point in time. In other embodiments, the data clipping, threshold, and event determination may be successively performed by the same or more than one device in real time or near real time.

Pre-set values 204 and event patterns 206 may be organized in specific data structures or format to facilitate selective retrieval from database 112, or devices 114-120 or server 104 if stored together with the clip, threshold, and/or event modules 106, 108, 110. Pre-set values 204 may comprise one or more pre-set or pre-determined values used in computations performed by the clip, threshold, and/or event modules 106, 108, 110. Event patterns 206 may comprise a plurality of sensor signal/data patterns or characteristics which may uniquely identify or represent a respective event or state as discussed above.

Figure 4A:
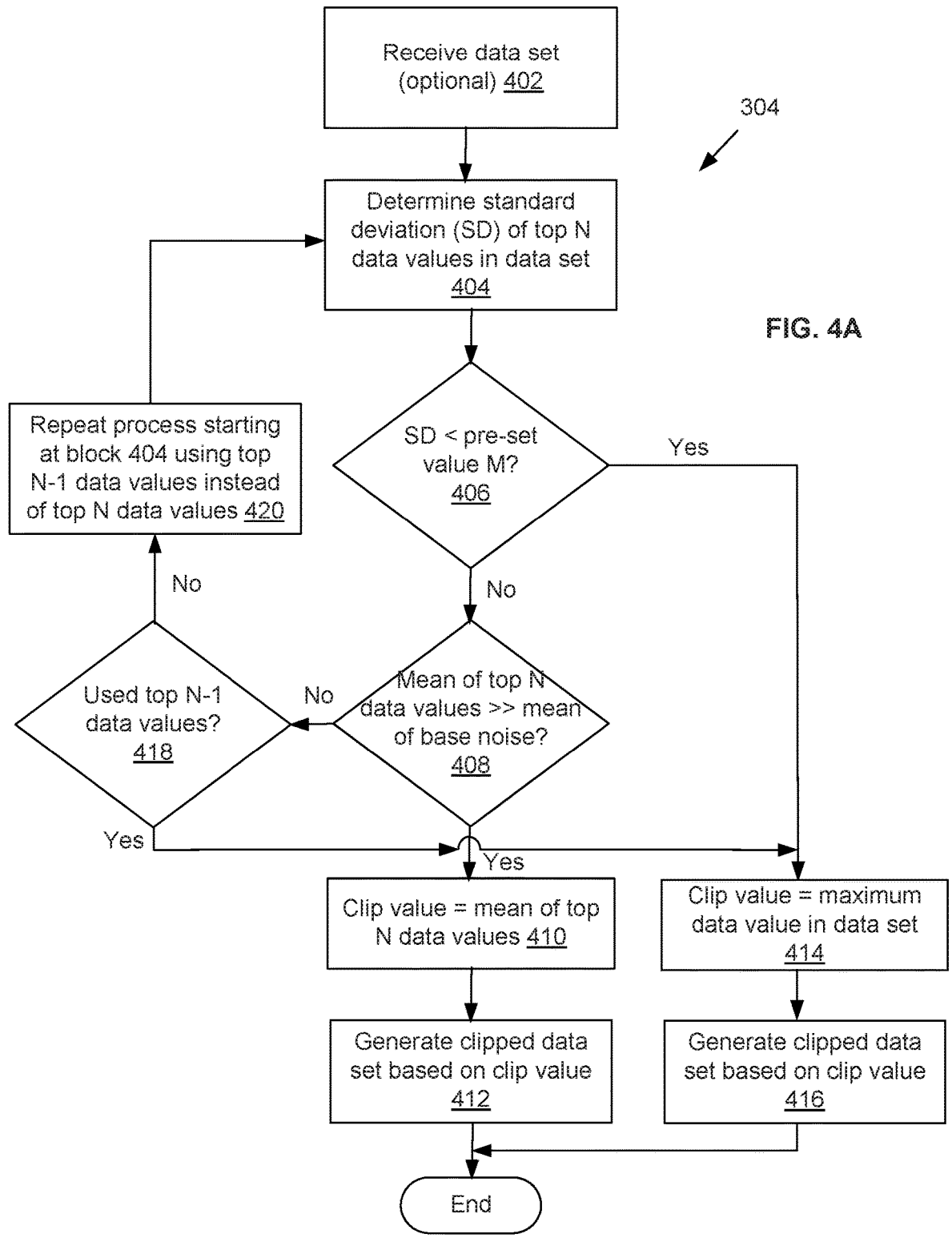
FIGS. 4A-4C depict additional details regarding the process of FIG. 3, according to some embodiments.
Figure 4B:
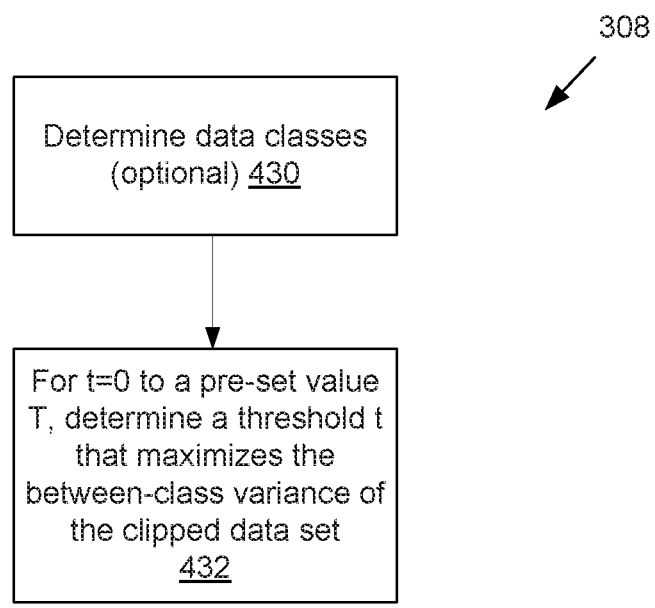
Figure 4C:
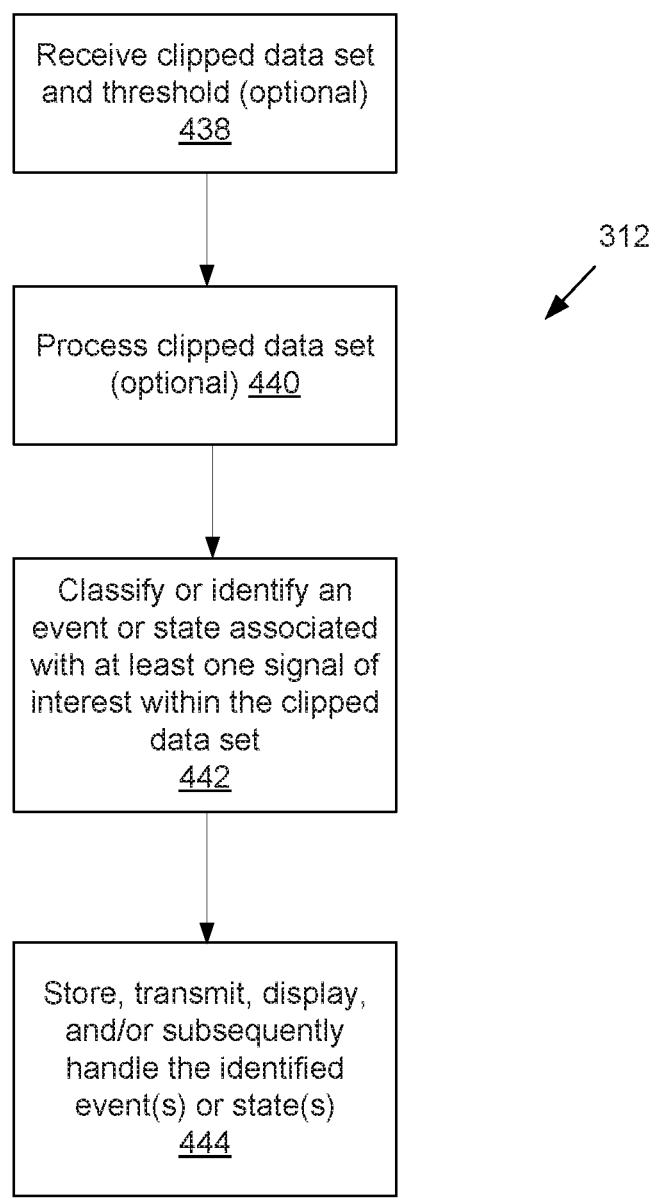

FIG. 3 depicts an example process 300 for automatic and adaptive event or state detection, according to some embodiments. FIGS. 4A-4C depict additional details regarding process 300, according to some embodiments. FIGS. 3 and 4A-4C are discussed in conjunction with each other.

In some embodiments, at block 304 of FIG. 3, the clip module 106 may receive sensor based data set 302 associated with a device from among the plurality of devices 114-120, and perform automatic data clip determination using the received sensor based data set 302 to generate a clip value associated with the sensor based data set 302. Automatic data clip determination may be performed to address potential data value(s) within the sensor based data set which may be disproportionally large compared to other data values within the sensor based data set, which if left unaddressed, may cause the subsequent threshold determined in block 308 to be inaccurate (e.g., too large for the sensor based data set). The sensor based data set 302 may be converted to a clipped data set 306 in accordance with the determined clip value.

Once the clipped data set 306 has been determined, the threshold module 308 may automatically determine a threshold 310 associated with the clipped data set 306 at block 308. The threshold 310, as discussed in detail below, may comprise the value denoting the separation or cutoff between a first class of data (e.g., signals or data values of interest) and a second class of data (e.g., noise) of the clipped data set 306.

Next, at block 312, the clipped data set 306 and the threshold 310 may be inputs to the event module 110. The event module 110 may analyze the clipped data set 306 in accordance with the threshold 310. For example, the threshold 310 may be used to separate the noise components from the signals or data values of interest within the clipped data set 306. The event module 110 may perform one or more further processing of the clipped data set 306 to ready the data set for automatic event detection. In some embodiments, the event module 110 may analyze the data set using the event patterns 206 to determine what event(s) or state(s) 314 may be associated with the data set. For example, the determined event(s) or state(s) 314 may identify the current state of a device among devices 114-1120 (e.g., compressor 1 of a particular device has turned on).

FIG. 4A depicts example details of block 304 of FIG. 3, in which example processes or algorithmic structure of the clip module 106 may be provided, according to some embodiments. At block 402, clip module 106 may receive a data set, such as the sensor based data set 302. The data set may also be referred to as a sensed data set, sensor data set, sensed data, sensor data, or the like. In some embodiments, the received data set may comprise time series data or data that is a function of time. In some embodiments, the received data set may comprise raw data, such as data outputted from sensors 200, or data derived from raw data, such as differences or changes in a moving average of the raw data.

As mentioned above, clip module 106 may be included, for example, in the server 104, and the clip module 106 may receive the data set from a device from among the plurality of devices 114-120. In alternative embodiments, block 402 may be optional when the data set and the clip module 106 are provided in the same device. For example, when sensor(s) included in the device 114 generates the data set and the device 114 includes the clip module 106.

Next, at block 404, clip module 106 may determine or compute a standard deviation (SD) of the top N data values in the data set. N may be a number based on the expected number of data points in the data set. For example, for a data set or stream of one to two hours, N may be set to 20. As another example, N may be approximately 5 to 10% of the number of data points in the data set.

The clip module 106 may compare the computed SD in block 404 against a pre-set value M, at block 406. In some embodiments, the pre-set value M may be equal to one (e.g., as in one standard deviation). The pre-set value M may be a value included in the pre-set values 204 (see FIG. 2). Alternatively, the pre-set value M may be greater than or less than one. When the computed SD is less than the pre-set value M (yes branch of block 406), then clipping at least some of the values in the data set is not necessary and the process proceeds to block 414.

When the computed SD is equal to or greater than the pre-set value M (no branch of block 406), then the clip module 106 may determine whether a mean of the top N data values of the data set is much greater than a mean of a base noise associated with the particular device from which the data set was obtained (block 408). In some embodiments, the clip module 106 may determine whether the mean of the top N data values is greater than the mean of the base noise by a factor of 100 or more. In alternative embodiments, the relevant difference between the two means may be a factor of 200, 150, 100, 90, 75, 10, or other pre-set difference (which may be specified in the pre-set values 204) indicative of a clear order of magnitude difference between the two means.

In some embodiments, base noise values associated with a particular device may be obtained by (minimally) turning on the particular device without also turning on its subsystems or components. For instance, if the particular device is a HVAC system, the HVAC system may be turned on and its sub-systems, such as compressors, fans, etc., are not yet turned on. In some embodiments, base noise values may be obtained as a data set separate from the data set received at block 402. In alternative embodiments, base noise values may be obtained from within the data set received at block 402, such as the first data values within the data set prior to a first peak within the data set.

When the difference between the two means satisfies the pre-set difference (yes branch of block 408), then at least some of the data values within the data set may be clipped or capped to a specific maximum value in order to prevent potential calculation of an inaccurate threshold for the data set. Such "clipping" action automatically and adaptively addresses the few data values within the data set that may be significantly greater than the rest of the data set, which in turn, may cause the associated threshold to be computed as a value that is higher than it otherwise should be. Among other things, having a too high threshold may undesirably filter out signals of interest within the data set.

In order to perform the "clipping" action, the clip module 106 may determine or compute a clip value at block 410. In some embodiments, the clip value at block 410 may comprise a mean of the top N data values of the data set. This clip value may comprise the capped or maximum data value "permitted" within the data set. Next, at block 412, the clip module 106 may generate a clipped data set (e.g., clipped data set 306) based on the clip value computed in block 410. In some embodiments, for each data value within the data set that is greater than the clip value of block 410, such data value may be converted or modified to equal the clip value. Thus, all data values within the clipped data set may be equal to or less than the clip value of block 410.

When the difference between the two means does not satisfy the pre-set difference (no branch of block 408), the process may return to block 404 to repeat the clip determination using the top N−1 data values of the data set (instead of the top N data values of the data set). Since the current iteration used the top N data values, the top N−1 data values were not used in the current iteration (no branch of block 418), and the process starting at block 404 may be repeated using the top N−1 data values instead of the top N data values at block 420.

Otherwise, if the top N−1 data values were used (yes branch of block 418), then "clipping" may not be required and the process proceeds to block 414 (same as with the yes branch of block 406). At block 414, the clip module 106 may determine or compute a clip value that is the same as a maximum data value within the data set. In other words, no "clipping" of any data values within the data set is necessary. Then at block 416, the clip module 106 may generate a clipped data set (e.g., clipped data set 306) based on the clip value of block 414. Because the data values may be no greater than the clip value, and the clip value is set to the maximum data value of the data set, the clipped data set of block 416 may be the same as the data set of block 402. The spread of the data values within the data set may be small enough that "clipping" or capping the maximum permitted data values may be unnecessary.

In this manner, the clip module 106, in some embodiments, may automatically analyze the data distribution (e.g., data value magnitudes) associated with the data set, and selectively constrain the data distribution so as to avoid unduly reducing the difference in the means of the signals of interest and noise while constraining the data distribution, when needed, to avoid computation of an inaccurate (e.g., too large) threshold for the data set.

In alternative embodiments, the two means discussed in connection with block 408 may comprise a means of the top N data values associated with the data set (the top N data values included in a first data class or the signals of interest within the data set) and a means of a second data class of the data set (e.g., the second data class may comprise the "undesirable" signals within the data set), wherein the first and second data classes may comprise two different types of data signals included within the data set that the threshold associated with the data set may be used to disambiguate.

FIG. 4B depicts example details of block 308 of FIG. 3, in which example processes or algorithmic structure of the threshold module 108 may be provided, according to some embodiments. At block 430, threshold module 108 may determine or identify at least two data classes or groups associated with the data set (or clipped data set), in which the threshold to be determined in block 432 may be used to automatically disambiguate, identify, or separate data values of the clipped data set into the at least two data classes or groups. In some embodiments, information associated with the data set, such as metadata, may specify the device, type of device, type of data set, or other information sufficient for the threshold module 108 to determine or identify the at least two data classes or groups associated with the clipped data set. In alternative embodiments, characteristics of the data set (or clipped data set) may enable the threshold module 108 to determine or identify the at least two data classes or groups.

In some embodiments, the at least two data classes or groups may comprise a first class and a second class, in which the first class may comprise signals of interest within the clipped data set—for which an event or state may be detected by the event module 110—and the second class may comprise signals not of interest or signals within the clipped data set that are not the signals of interest—which are to be filtered out from the clipped data set as undesirable or extraneous for event or state detection. In some embodiments, the data set and the corresponding clipped data set may comprise a plurality of electrical signals (or data values) having a range of magnitudes as a function of time. For example, the first class may comprise signals indicative of equipment turning on or off; switching between high, low, medium, or other intermediate state; or undergoing a state change (e.g., compressor 1 on/off, fan on/off, compressor 2 on/off, etc.), while the second class may comprise signals indicative of noise or base noise. As another example, the first class may comprise signals indicative of outlier behavior or state, while the second class may comprise signals not indicative of outlier behavior or state. As still another example, the first class may comprise signals indicative of some kind of change, while the second class may comprise signals not indicative of change. In some embodiments, the data set and the corresponding clipped data set may comprise a plurality of electrical signals (or data values) having a range of magnitudes as a function of frequency (e.g., frequency series data). For instance, fast Fourier transform may be applied to time series data to obtain the spectral contents of signals.

In some embodiments, when the threshold module 108 is already configured to detect a threshold for particular first and second classes, block 430 may be optional. For example, the data set and clipped data set may already be known to be associated with sub-components of a device turning on or off.

At block 432, the threshold module 108 may determine a threshold (e.g., threshold 310) for the clipped data set. In some embodiments, the threshold module 108 may determine a threshold t at which equation (1) below provides a maximum between-class variance (the second term of equation (1)), and correspondingly, a minimum or smallest weighted within-class variance (the first term of equation (1)), from among t=0 to a pre-set value T, such as 15.

$$\sigma^2 = \sigma_w^2(t) + q_1(t)[1-q_1(t)][\mu_1(t)-\mu_2(t)]^2 \tag{1}$$

where $\sigma^2$ is total variance,
$\sigma_w^2(t)$ is within-class variance,
$q_1(t)[1-q_1(t)][\mu_1(t)-\mu_2(t)]^2$ is between-class variance, $$\mu_1(t) = \sum_{i=1}^{t} \frac{iP(i)}{q_1(t)}$$

is a class means on a side of t, $$\mu_2(t) = \sum_{i=t+1}^{I} \frac{iP(i)}{q_2(t)}$$

is a class means on the other side of t, and
$q_1(t)=\Sigma_{i=1}^{t} P(i)$ is a class probability.

In some embodiments, the determination of the threshold may be based on Fisher discriminant analysis. The within-class and between-class variances may relate to the first and second classes associated with the clipped data set. In some embodiments, the range or levels t through which equation (1) is run through to find the particular value t at which the variance between the two classes is the maximum or largest from among the full range or levels oft may correspond to a histogram of the full range of magnitudes of the clipped data set. Hence, the particular threshold t determined by the threshold module 108 in accordance with the equation above may correspond to a particular magnitude of the clipped data set, in which signals or data having magnitudes above the threshold value may be classified as belonging to the first class (e.g., the signals of interest) and signals or data having magnitudes below the threshold value may be classified as belonging to the second class (e.g., noise or signals not of interest to be filtered out or ignored).

FIG. 4C depicts example details of block 312 of FIG. 3, in which example processes or algorithmic structure of the event module 110 may be provided, according to some embodiments. At block 438, the event module 110 may receive the clipped data set and threshold to perform further analysis and analytics. In some embodiments, clip and threshold modules 106, 108 may be located separately from the event module 110. For example, clip and threshold modules 106, 108 may be included in device 114 and the event module 110 may be included in server 104. Alternatively, if at least the threshold module 108 and event module 110 are included in the same machine (e.g., server 104), block 438 may be optional.

At block 440, event module 110 may process the clipped data set in preparation of use in classifying or identifying an event or state indicated by at least a portion of the signal of interest within the clipped data set. For instance, all signals within the clipped data set having a magnitude above the threshold determined in FIG. 4B (e.g., the signals of interest within the first class) may be made uniform to each other by modifying their magnitudes to a new same maximum value. As another example, signals within the clipped data set having a magnitude above the determined threshold may be analyzed to find changes in moving average differences between adjacent signals, so as to eliminate possible signal artifact(s) that may exist next to actual signals (e.g., two signals that are close in time to each other may indicate that one of the signals is an artifact because no subcomponent of a device can turn on and turn on again within that close of a time period).

In alternative embodiments, block 440 may be optional when the clipped data set need not be processed in order to properly perform block 442.

Next at block 442, the event module 110 may classify or identify an event or state associated with at least one signal of interest within the clipped data set. In some embodiments, the event module 110 may analyze a ten second window of data around the signal of interest to determine the event or state indicated by the signal of interest. The event module 110 may compare the ten second window of data around the signal of interest (or at least the signal of interest) to a plurality of event patterns 206, and find an event pattern from among the plurality of event patterns 206 that is a match (or best match) to the ten second window of data around the signal of interest (or at least the signal of interest). Characteristics of the signal of interest (and signals proximate the signal of interest) may permit identification of various device activities. The best matching event pattern, in turn, may be associated with a particular event or state (e.g., event(s) 314 in FIG. 3) such as, but not limited to, a particular fan switching on, the particular fan switching off, compressor 1 switching on, compressor 2 switching to a higher operational speed, etc.

When the clipped data set includes more than one signal of interest, block 442 may be repeated for each signal of interest to detect an event or state associated with respective signals of interest.

At block 444, the event module 110 may store, transmit, display, and/or otherwise subsequently handle the identified event(s) or state(s).

In this manner, each sensor based data set associated with a device may be automatically analyzed and corresponding (electrical) events or states of the device may be detected in real-time or near real-time. Because the data clipping and threshold determination techniques may be applied to the particular sensor based data set—as opposed to all sensor based data sets or defaults in general—for use by only the same particular sensor based data set, the data clipping and threshold are specific or adaptive to the particular sensor based data set. This means, for example, that even for the same device, a first sensor based data set associated with a first time period and a second sensor based data set associated with a second time period may have the same or different clip values and/or thresholds from each other. The clip values and/or thresholds may be different from each other, for example, because of changes in noise levels, signal maximums, etc. at different times of the day or week. Such computed clip values and thresholds may correctly separate the signals of interest from the rest of the signals within the sensor based data set, all without human intervention or manual oversight.

Figure 5A:
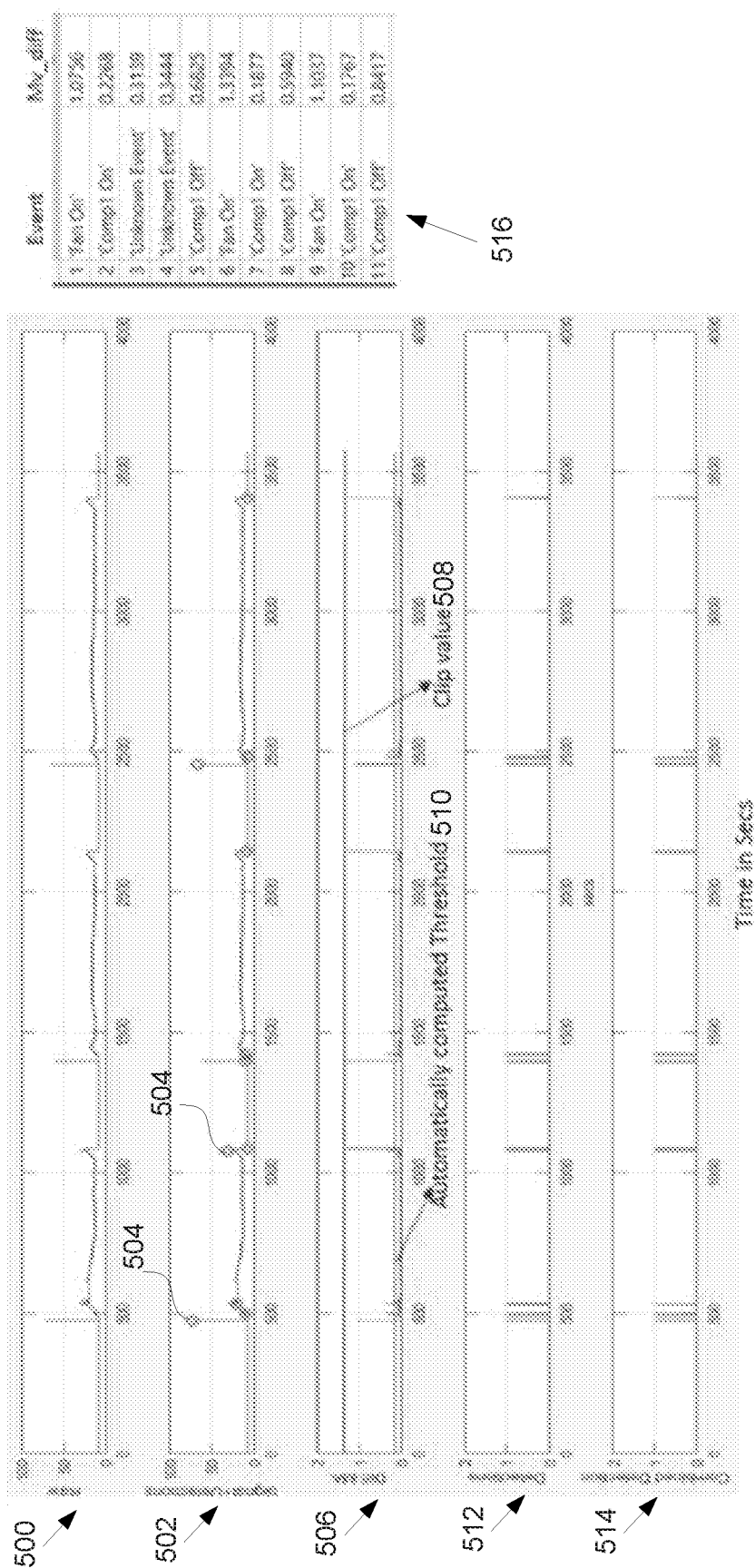
FIGS. 5A-5D depict plots of example sensor based data sets and associated clipped data sets upon implementation of the data clipping and threshold determination techniques disclosed herein, according to some embodiments.
Figure 5B:
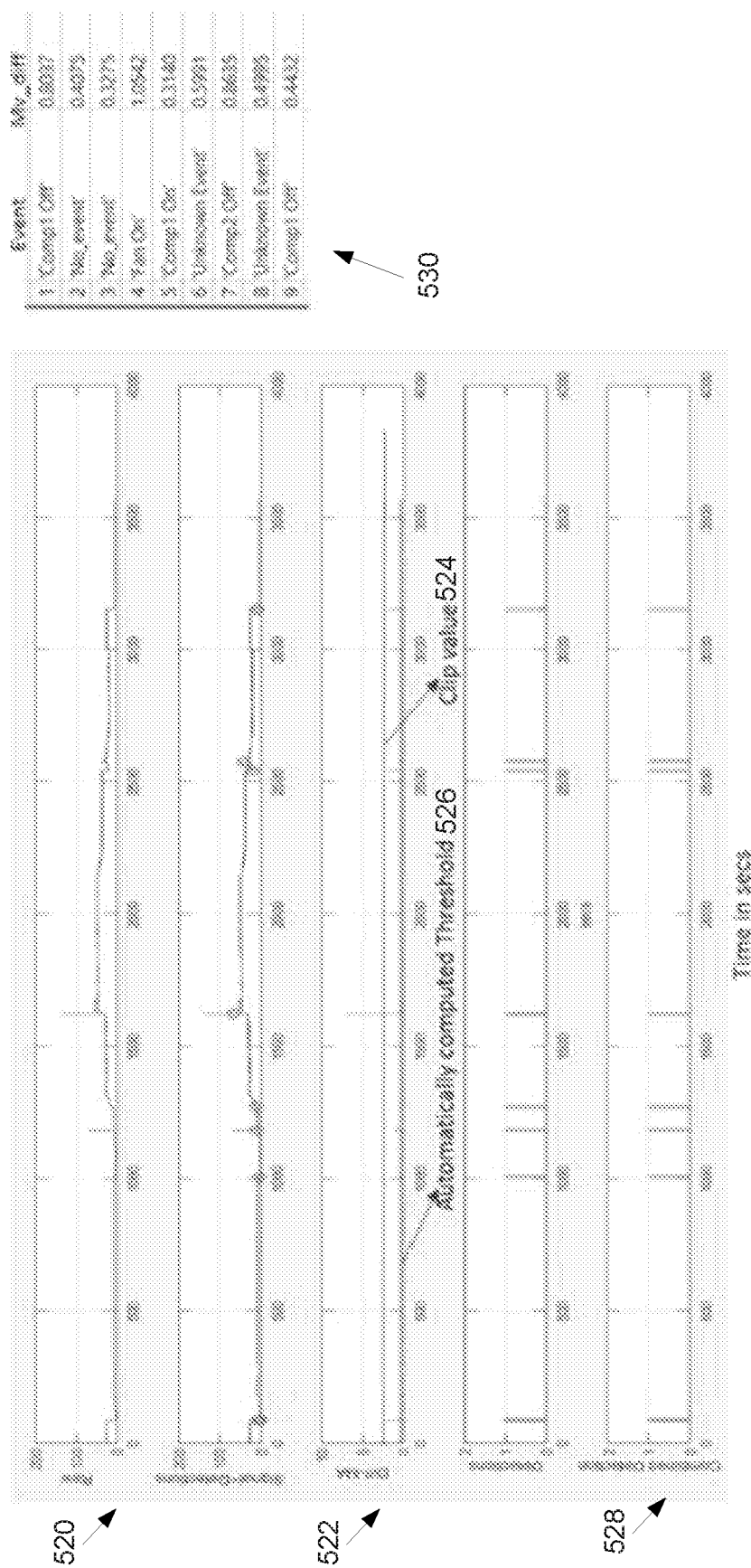

FIGS. 5A-5D depict plots of example sensor based data sets and associated clipped data sets upon implementation of the data clipping and threshold determination techniques disclosed herein, according to some embodiments. FIGS. 5A-5B depict plots associated with a particular model of HVAC unit. Referring to FIG. 5A, a first plot 500 may comprise a sensor based data set associated with the particular model of HVAC unit, in which the sensor based data set may comprise raw sensor output data from a sensor coupled to the particular model of HVAC unit. A second plot 502 may be the same as first plot 500 with the inclusion of highlights 504 pointing out each spike or peak in the data set. Eleven such spikes or peaks are noted in second plot 500, each of which may be associated with a particular electrical event or state of the particular model of HVAC unit.

A third plot 506 may be similar to first plot 500 and include a notation 508 denoting the clip value computed for the sensor based data set and a notation 510 denoting the threshold computed for the sensor based data set. In third plot 506, both the clip value and maximum value of the sensor based data set may be 1.339422, which means that clipping or constraining the sensor based data set is not required. The threshold value may be 0.167974 in the third plot 506. Signals above the threshold of 0.167974 may comprise signals of interest or a first class of data while signals below the threshold value may comprise noise, artifacts, or other signals not of interest.

A fourth plot 512 may comprise a processed data set based on the clip value and sensor based data set, in which signals existing above the threshold value may be converted into signals of the same magnitude as each other, such as a magnitude equal to the clip value. A fifth plot 514 may comprise the processed data set to which additional processing may have been applied to remove potential artifacts. Lastly, when event module 110 performs event detection analytics on the data set shown in the fifth plot 514, an event may be identified for each of the eleven signals of interest shown in the fifth plot 514, as shown in table 516.

FIG. 5B depicts a series of plots associated with another set of sensor based data associated with the same HVAC unit as for FIG. 5A, in which the progression of the series of plots may be similar to those discussed above for FIG. 5A. Note the difference in the sensor based data set shown in a first plot 520 to the sensor based data set shown in the first plot 500 of FIG. 5A. Accordingly, the computed clip value and threshold may also be different than in FIG. 5A. A third plot 522 shows a notation 524 denoting a clip value of 2.384025 and a notation 526 denoting a threshold of 0.308775. The maximum data value of the sensor based data set may be 7.104271. The computed clip value of 2.384025 is less than the maximum data value of 7.104271; hence, the data values in the sensor based data set may be constrained to be no greater than the clip value. In other words, unlike in FIG. 5A, the sensor based data set is not identical to the clipped data set associated therewith. A table 530 shows the electrical events detected by the event module 110 based on respective signals of interest (the peaks or spikes shown in a fifth plot 528).

Figure 5C:
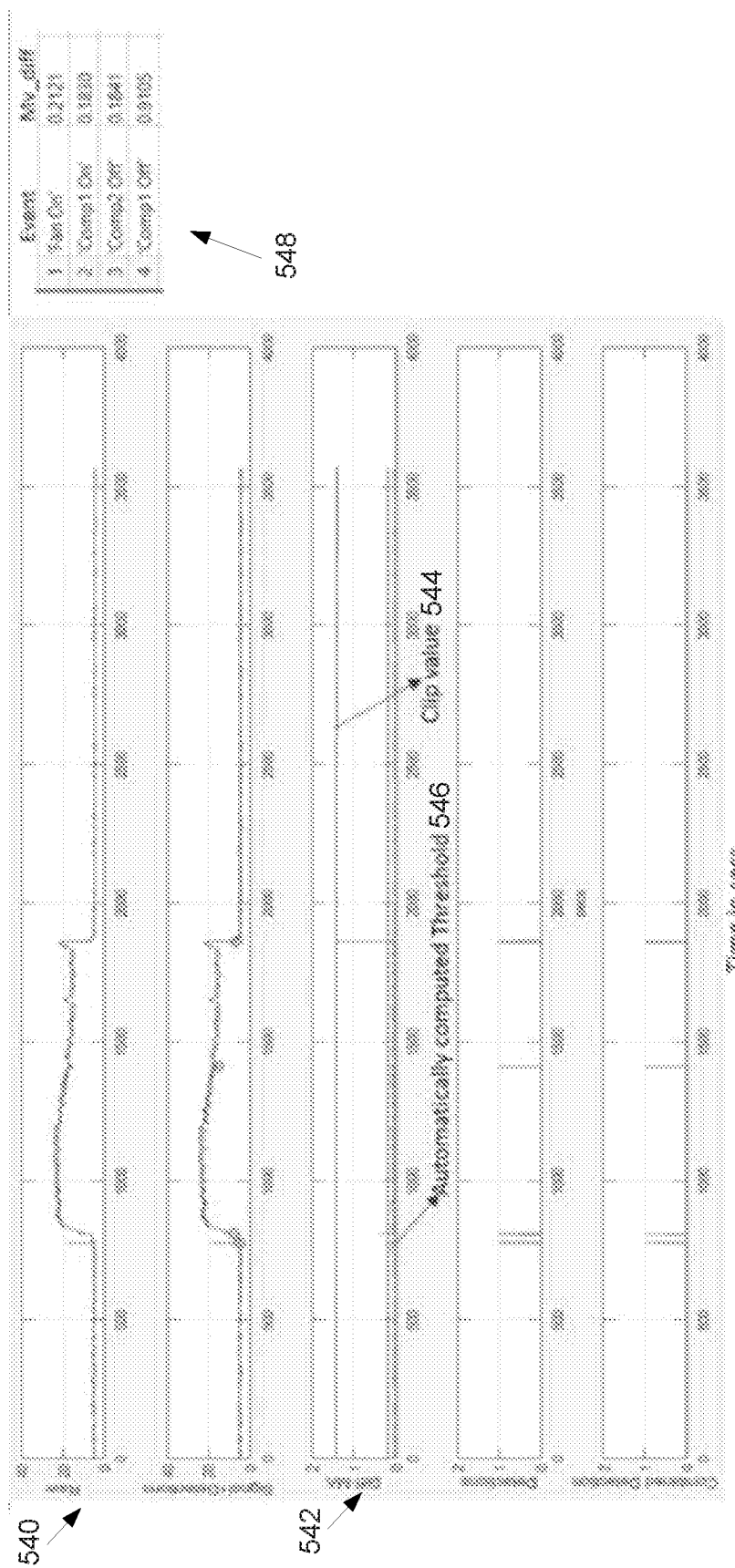
Figure 5D:
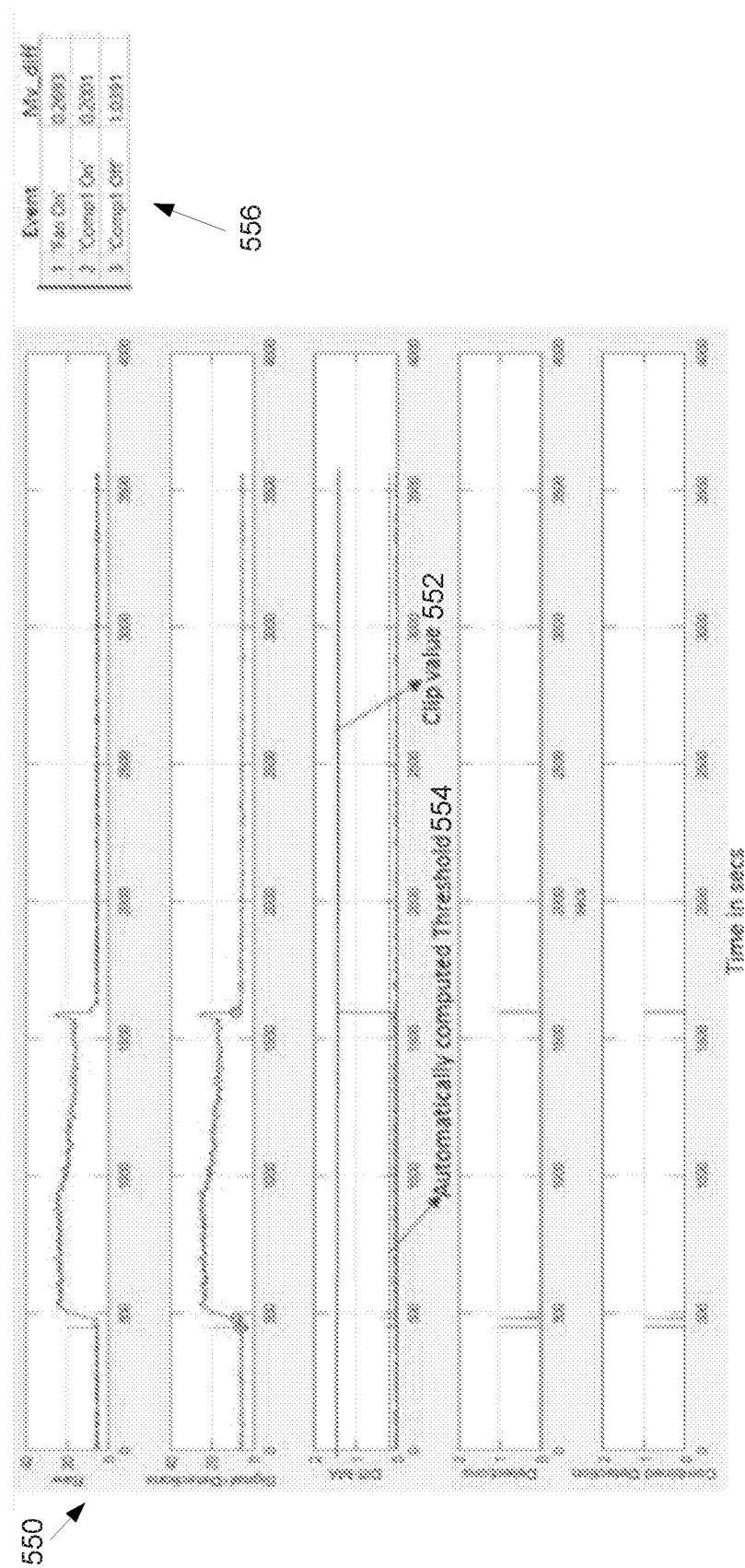

FIGS. 5C-5D depict plots associated with another particular model of HVAC unit, in which the series of plots in each of FIGS. 5C and 5D show a progression similar to those discussed above for FIG. 5A. In FIG. 5C, a first plot 540 depicts a sensor based data set associated with the particular model of HVAC unit that is different from the model of HVAC unit of FIGS. 5A-5B. In a third plot 542, a notation 544 denotes a clip value computed by the clip module 106 and a notation 546 denotes a threshold computed by the threshold module 108 based on the sensor based data set in the first plot 540. The clip value may be 1.432363, the threshold may be 0.179205, and the maximum data value or signal may have a magnitude of 1.432363. A table 548 shows events associated with respective signals of interest included in the sensor based data set detected by the event module 110.

In FIG. 5D, a notation 552 denotes a clip value of 1.445626 and a notation 554 denotes a threshold of 0.189532 computed for the sensor based data set shown in a first plot 550. Note the differences in the events detected in a table 556 for the sensor based data set shown in the first plot 550 in comparison to the events shown in table 548 for a different set of sensor based data for the same HVAC unit.

FIGS. 5A-5D illustrate the robustness of implementation of the clipping and threshold determination techniques across various data sets, various data distributions among the different data sets, ability to identify various events, and the like.

Figure 6:
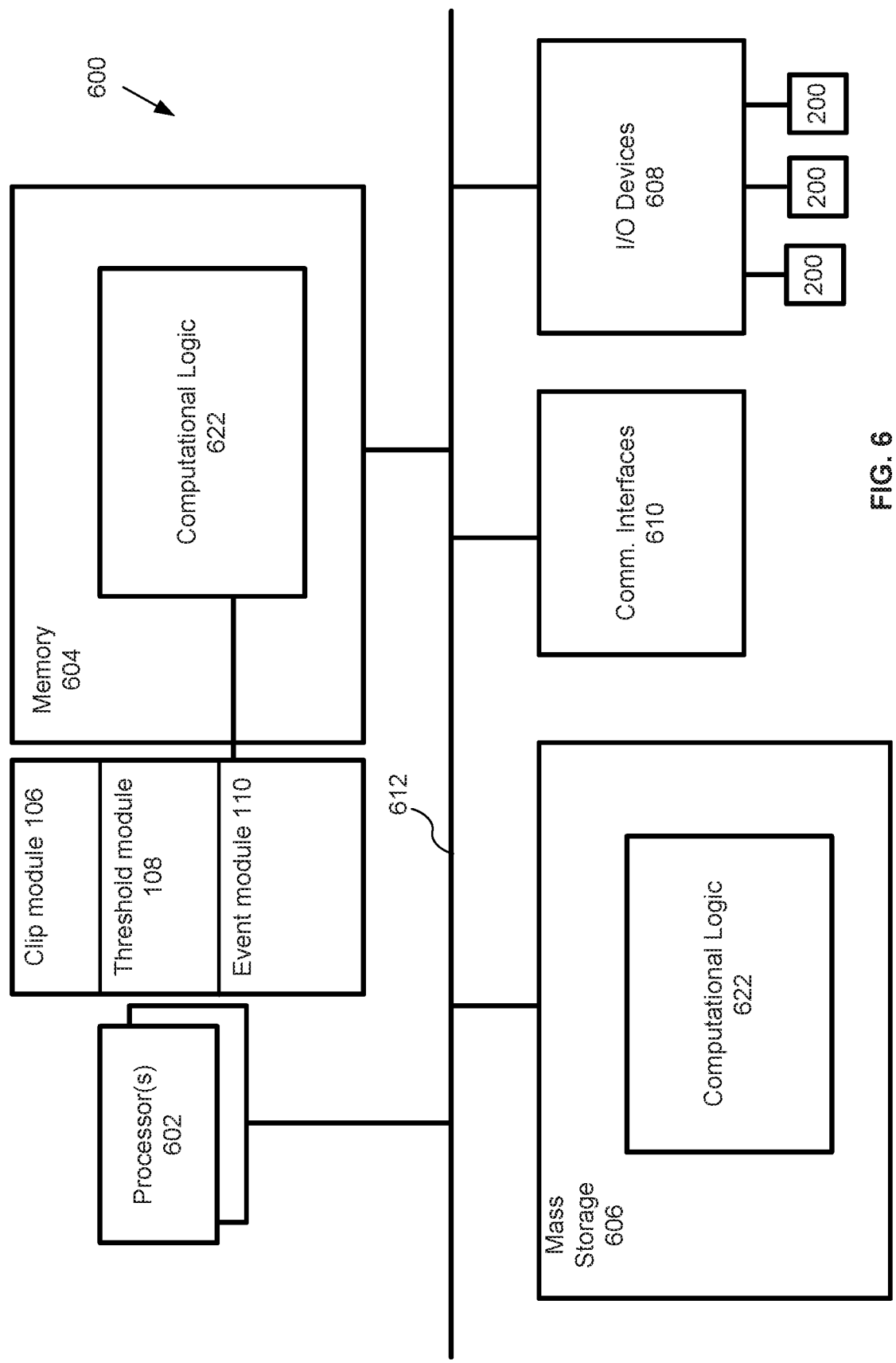
FIG. 6 illustrates an example computer device suitable for use to practice aspects of the present disclosure, in accordance with various embodiments.

FIG. 6 illustrates an example computer device 600 suitable for use to practice aspects of the present disclosure, in accordance with various embodiments. In some embodiments, computer device 600 may comprise any of the server 104, database 112, and/or devices 114-120. As shown, computer device 600 may include one or more processors 602, and system memory 604. The processor 602 may include any type of processors. The processor 602 may be implemented as an integrated circuit having a single core or multi-cores, e.g., a multi-core microprocessor. The computer device 600 may include mass storage devices 606 (such as diskette, hard drive, volatile memory (e.g., DRAM), compact disc read only memory (CD-ROM), digital versatile disk (DVD), flash memory, solid state memory, and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computer device 600 may further include input/output (I/O) devices 608 (such as a display 602), keyboard, cursor control, remote control, gaming controller, image capture device, and so forth and communication interfaces 610 (such as network interface cards, modems, infrared receivers, radio receivers (e.g., Bluetooth)), and so forth. I/O devices 608 may further include and/or be coupled to sensors 600.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computer device 600 elements may be coupled to each other via a system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations associated with system 100, e.g., operations associated with providing clip module 106, threshold module 108, and/or event module 110 as described above, generally shown as computational logic 622. Computational logic 622 may be implemented by assembler instructions supported by processor(s) 602 or high-level languages that may be compiled into such instructions. The permanent copy of the programming instructions may be placed into mass storage devices 606 in the factory, or in the field, through, for example, a distribution medium (not shown), such as a compact disc (CD), or through communication interfaces 610 (from a distribution server (not shown)).

FIG. 7 illustrates an example non-transitory computer-readable storage media 702 having instructions configured to practice all or selected ones of the operations associated with the processes described above. As illustrated, non-transitory computer-readable storage medium 702 may include a number of programming instructions 704 (e.g., clip module 106, threshold module 108, event module 110). Programming instructions 704 may be configured to enable a device, e.g., computer device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

Referring again to FIG. 6, the number, capability, and/or capacity of the elements 608, 610, 612 may vary, depending on whether computer device 600 is used as a stationary computing device, such as a set-top box or desktop computer, or a mobile computing device, such as a tablet computing device, laptop computer, game console, an Internet of Things (IoT), or smartphone. Their constitutions are otherwise known, and accordingly will not be further described.

At least one of processors 602 may be packaged together with memory having computational logic 622 configured to practice aspects of embodiments described in reference to FIGS. 1-6. For example, computational logic 622 may be configured to include or access clip module 106. In some embodiments, at least one of the processors 602 may be packaged together with memory having computational logic 622 configured to practice aspects of process 300 to form a System in Package (SiP) or a System on Chip (SoC).

In various implementations, the computer device 600 may comprise a laptop, a netbook, a notebook, an ultrabook, a smartphone, a tablet, an Internet of Things (IoT) device, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computer device 600 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, and/or methods of various embodiments are provided below. An embodiment of the devices, systems, and/or methods may include any one or more, and any combination of, the examples described below.

Example 1 is an apparatus including one or more processors; and first and second modules to be executed by the one or more processors, the first module to selectively constrain a sensor based data set, wherein to selectively constrain the sensor based data set, the first module is to analyze a distribution of the sensor based data set to determine whether to constrain the sensor based data set, the sensor based data set associated with one or more states of a device and the sensor based data set including a first class and a second class of data values, and the second module to determine a threshold associated with the sensor based data set, wherein to determine the threshold, the second module is to select the threshold based on a variance between the first and second classes of the sensor based data set, wherein the second module is to select the threshold using a constrained sensor based data set when the first module determines that the sensor based data set is to be constrained, and wherein the threshold indicates the data values associated with the first and second classes.

Example 2 may include the subject matter of Example 1, and may further include one or more storage medium to store a plurality of state patterns; and a third module to be executed by the one or more processors, the third module to identify a state of the device, wherein to identify the state of the device, the third module is to compare one or more data values included in the sensor based data set belonging to the first class in accordance with the threshold, to the plurality of state patterns.

Example 3 may include the subject matter of any of Examples 1-2, and may further include wherein the third module is to identify a match between the one or more data values included in the sensor based data set belonging to the first class to a particular state pattern from among the plurality of state patterns, the particular state pattern associated with the state.

Example 4 may include the subject matter of any of Examples 1-3, and may further include wherein the first class comprises data values of interest, the second class comprises data values not of interest, and the data values included in the first class are at least indicative of the one or more states of the device.

Example 5 may include the subject matter of any of Examples 1-4, and may further include wherein the first class includes data values indicative of an outlier state, data values indicative of a change state, data values indicative of a sub-component included in the device turning on or off, or data values indicative of a particular sub-component included in the device.

Example 6 may include the subject matter of any of Examples 1-5, and may further include wherein the sensor based data set comprises time series data or frequency series data based on Fourier transform of the time series data.

Example 7 may include the subject matter of any of Examples 1-6, and may further include wherein the second module is to select the threshold based on a weighted variance within the first and second classes of the sensor based data set.

Example 8 may include the subject matter of any of Examples 1-7, and may further include wherein the device comprises a mechanical device, an electro-mechanical device, a heating device, a ventilating device, and air conditioning (HVAC) system, a compressor, a fan, a humidifier, a dehumidifier, a condenser, a freezer, a refrigerator, a refrigerant system, an air filtration system, a motor, a generator, a transformer, or a power source.

Example 9 may include the subject matter of any of Examples 1-8, and may further include wherein the one or more states of the device comprises a state of a sub-component included in the device.

Example 10 may include the subject matter of any of Examples 1-9, and may further include wherein the first module is to analyze the distribution of the sensor based data set to determine whether to constrain the sensor based data set comprises to determine whether a standard deviation of top N data values of the sensor based data set is greater than a pre-set value M; when the standard deviation is determined to be greater than the pre-set value M, to determine whether a difference between a mean of the top N data values and a mean of base noise of the sensor based data set is greater than a pre-determined value; and when the difference is determined to be greater than the pre-determined value, to constrain magnitude of data values included in the sensor based data set to a mean of the top N data values.

Example 11 may include the subject matter of any of Examples 1-10, and may further include wherein the first module is to analyze the distribution of the sensor based data set to determine whether to constrain the sensor based data set comprises when the standard deviation is determined not to be greater than the pre-set value M, to not constrain the sensor based data set.

Example 12 may include the subject matter of any of Examples 1-11, and may further include wherein the first module is to analyze the distribution of the sensor based data set to determine whether to constrain the sensor based data set comprises, when the difference is determined not to be greater than the pre-determined value, to determine a second standard deviation of top N−1 data values of the sensor based data and determine whether a second difference between a mean of the top N−1 data values and the mean of base noise is greater than the pre-determined value, and when the second difference is greater than the pre-determined value, to constrain the magnitude of data values included in the sensor based data set to a mean of the top N−1 data values.

Example 13 may include the subject matter of any of Examples 1-12, and may further include wherein the pre-set value M comprises one standard deviation.

Example 14 may include the subject matter of any of Examples 1-13, and may further include wherein N comprises 20 or approximately 5 to 10% of a total number of data values of the sensor based data set.

Example 15 may include the subject matter of any of Examples 1-14, and may further include wherein the device is associated with one or more sensors, and the one or more sensors comprises a thermocouple, a temperature sensor, an accelerometer, a gyroscope, a barometric sensor, a motion sensor, an audio sensor, a visual sensor, a camera, an infrared sensor, a vibration sensor, a pressure sensor, a location sensor, a global positioning system (GPS), a radio detection and ranging (RADAR), a light radar (LIDAR), a photodetector, a current transformer, a voltmeter, or a power meter.

Example 16 may include the subject matter of any of Examples 1-15, and may further include wherein the apparatus comprises a server to service the device, and wherein the sensor based data set is associated with the device.

Example 17 is a computer-implemented method including selectively constraining a sensor based data set associated with one or more states of a device, wherein selectively constraining the sensor based data set includes analyzing a distribution of the sensor based data set to determine whether to constrain the sensor based data set, the sensor based data set including a first class and a second class of data values; and determining a threshold associated with the sensor based data set, wherein determining the threshold includes selecting the threshold based on a variance between the first and second classes of the sensor based data set, wherein selecting the threshold includes using a constrained sensor based data set when the sensor based data set is determined to be constrained, and wherein the threshold indicates the data values associated with the first and second classes.

Example 18 may include the subject matter of Example 17, and may further include identifying a state of the device, wherein identifying the state of the device includes comparing one or more data values included in the sensor based data set belonging to the first class in accordance with the threshold, to a plurality of state patterns.

Example 19 may include the subject matter of any of Examples 17-18, and may further include identifying a match between the one or more data values included in the sensor based data set belonging to the first class to a particular state pattern from among the plurality of state patterns, the particular state pattern associated with the state.

Example 20 may include the subject matter of any of Examples 17-19, and may further include wherein the first class comprises data values of interest, the second class comprises data values not of interest, and the data values included in the first class are at least indicative of the one or more states of the device.

Example 21 may include the subject matter of any of Examples 17-20, and may further include wherein the first class includes data values indicative of an outlier state, data values indicative of a change state, data values indicative of a sub-component included in the device turning on or off, or data values indicative of a particular sub-component included in the device.

Example 22 may include the subject matter of any of Examples 17-21, and may further include wherein the sensor based data set comprises time series data or frequency series data based on Fourier transform of the time series data.

Example 23 may include the subject matter of any of Examples 17-22, and may further include wherein selecting the threshold is based on a weighted variance within the first and second classes of the sensor based data set.

Example 24 may include the subject matter of any of Examples 17-23, and may further include wherein the device comprises a mechanical device, an electro-mechanical device, a heating device, a ventilating device, and air conditioning (HVAC) system, a compressor, a fan, a humidifier, a dehumidifier, a condenser, a freezer, a refrigerator, a refrigerant system, an air filtration system, a motor, a generator, a transformer, or a power source.

Example 25 may include the subject matter of any of Examples 17-24, and may further include wherein the one or more states of the device comprises a state of a sub-component included in the device.

Example 26 may include the subject matter of any of Examples 17-25, and may further include wherein analyzing the distribution of the sensor based data set to determine whether to constrain the sensor based data set comprises determining whether a standard deviation of top N data values of the sensor based data set is greater than a pre-set value M; when the standard deviation is determined to be greater than the pre-set value M, determining whether a difference between a mean of the top N data values and a mean of base noise of the sensor based data set is greater than a pre-determined value; and when the difference is determined to be greater than the pre-determined value, constraining magnitude of data values included in the sensor based data set to a mean of the top N data values.

Example 27 may include the subject matter of any of Examples 17-26, and may further include wherein analyzing the distribution of the sensor based data set to determine whether to constrain the sensor based data set comprises, when the standard deviation is determined not to be greater than the pre-set value M, not constraining the sensor based data set.

Example 28 may include the subject matter of any of Examples 17-27, and may further include wherein analyzing the distribution of the sensor based data set to determine whether to constrain the sensor based data set comprises, when the difference is determined not to be greater than the pre-determined value, determining a second standard deviation of top N−1 data values of the sensor based data and determining whether a second difference between a mean of the top N−1 data values and the mean of base noise is greater than the pre-determined value, and, when the second difference is greater than the pre-determined value, constraining the magnitude of data values included in the sensor based data set to a mean of the top N−1 data values.

Example 29 may include the subject matter of any of Examples 17-28, and may further include wherein the pre-set value M comprises one standard deviation.

Example 30 may include the subject matter of any of Examples 17-29, and may further include wherein N comprises 20 or approximately 5 to 10% of a total number of data values of the sensor based data set.

Example 31 may include the subject matter of any of Examples 17-30, and may further include wherein the device is associated with one or more sensors, and the one or more sensors comprises a thermocouple, a temperature sensor, an accelerometer, a gyroscope, a barometric sensor, a motion sensor, an audio sensor, a visual sensor, a camera, an infrared sensor, a vibration sensor, a pressure sensor, a location sensor, a global positioning system (GPS), a radio detection and ranging (RADAR), a light radar (LIDAR), a photodetector, a current transformer, a voltmeter, or a power meter.

Example 32 is one or more computer-readable storage medium comprising a plurality of instructions to cause an apparatus, in response to execution by one or more processors of the apparatus, to selectively constrain a sensor based data set associated with one or more states of a device, wherein to selectively constrain the sensor based data set includes to analyze a distribution of the sensor based data set to determine whether to constrain the sensor based data set, the sensor based data set including a first class and a second class of data values; and determine a threshold associated with the sensor based data set, wherein to determine the threshold includes to select the threshold based on a variance between the first and second classes of the sensor based data set, wherein to select the threshold includes using a constrained sensor based data set when the sensor based data set is determined to be constrained, and wherein the threshold indicates the data values associated with the first and second classes.

Example 33 may include the subject matter of Example 32, and may further include wherein the plurality of instructions, in response to execution by the one or more processors of the apparatus, further cause to identify a state of the device, wherein to identify the state of the device includes comparing one or more data values included in the sensor based data set belonging to the first class in accordance with the threshold, to a plurality of state patterns.

Example 34 may include the subject matter of any of Examples 32-33, and may further include wherein the plurality of instructions, in response to execution by the one or more processors of the apparatus, further cause to identify a match between the one or more data values included in the sensor based data set belonging to the first class to a particular state pattern from among the plurality of state patterns, the particular state pattern associated with the state.

Example 35 may include the subject matter of any of Examples 32-34, and may further include wherein the first class comprises data values of interest, the second class comprises data values not of interest, and the data values included in the first class are at least indicative of the one or more states of the device.

Example 36 may include the subject matter of any of Examples 32-35, and may further include wherein the first class includes data values indicative of an outlier state, data values indicative of a change state, data values indicative of a sub-component included in the device turning on or off, or data values indicative of a particular sub-component included in the device.

Example 37 may include the subject matter of any of Examples 32-36, and may further include wherein the sensor based data set comprises time series data or frequency series data based on Fourier transform of the time series data.

Example 38 may include the subject matter of any of Examples 32-37, and may further include wherein to select the threshold is based on a weighted variance within the first and second classes of the sensor based data set.

Example 39 may include the subject matter of any of Examples 32-38, and may further include wherein the device comprises a mechanical device, an electro-mechanical device, a heating device, a ventilating device, and air conditioning (HVAC) system, a compressor, a fan, a humidifier, a dehumidifier, a condenser, a freezer, a refrigerator, a refrigerant system, an air filtration system, a motor, a generator, a transformer, or a power source.

Example 40 may include the subject matter of any of Examples 32-39, and may further include wherein the one or more states of the device comprises a state of a sub-component included in the device.

Example 41 may include the subject matter of any of Examples 32-40, and may further include wherein to analyze the distribution of the sensor based data set to determine whether to constrain the sensor based data set comprises to determine whether a standard deviation of top N data values of the sensor based data set is greater than a pre-set value M; when the standard deviation is determined to be greater than the pre-set value M, determine whether a difference between a mean of the top N data values and a mean of base noise of the sensor based data set is greater than a pre-determined value; and when the difference is determined to be greater than the pre-determined value, constrain magnitude of data values included in the sensor based data set to a mean of the top N data values.

Example 42 may include the subject matter of any of Examples 32-41, and may further include wherein to analyze the distribution of the sensor based data set to determine whether to constrain the sensor based data set comprises to, when the standard deviation is determined not to be greater than the pre-set value M, not constrain the sensor based data set.

Example 43 may include the subject matter of any of Examples 32-42, and may further include wherein to analyze the distribution of the sensor based data set to determine whether to constrain the sensor based data set comprises to, when the difference is determined not to be greater than the pre-determined value, determine a second standard deviation of top N−1 data values of the sensor based data and determine whether a second difference between a mean of the top N−1 data values and the mean of base noise is greater than the pre-determined value, and, when the second difference is greater than the pre-determined value, constrain the magnitude of data values included in the sensor based data set to a mean of the top N−1 data values.

Example 44 may include the subject matter of any of Examples 32-43, and may further include wherein the pre-set value M comprises one standard deviation.

Example 45 may include the subject matter of any of Examples 32-44, and may further include wherein N comprises 20 or approximately 5 to 10% of a total number of data values of the sensor based data set.

Example 46 may include the subject matter of any of Examples 32-45, and may further include wherein the device is associated with one or more sensors, and the one or more sensors comprises a thermocouple, a temperature sensor, an accelerometer, a gyroscope, a barometric sensor, a motion sensor, an audio sensor, a visual sensor, a camera, an infrared sensor, a vibration sensor, a pressure sensor, a location sensor, a global positioning system (GPS), a radio detection and ranging (RADAR), a light radar (LIDAR), a photodetector, a current transformer, a voltmeter, or a power meter.

Example 47 is an apparatus including means for selectively constraining a sensor based data set associated with one or more states of a device, wherein the means for selectively constraining analyzes a distribution of the sensor based data set to determine whether to constrain the sensor based data set, the sensor based data set including a first class and a second class of data values; and means for determining a threshold associated with the sensor based data set in communication with the means for selectively constraining, wherein the means for determining the threshold selects the threshold based on a variance between the first and second classes of the sensor based data set, wherein the means for determining uses a constrained sensor based data set to select the threshold when the sensor based data set is determined to be constrained, and wherein the threshold indicates the data values associated with the first and second classes.

Example 48 may include the subject matter of Example 47, and may further include means for identifying a state of the device, wherein the means for identifying the state of the device compares one or more data values included in the sensor based data set belonging to the first class in accordance with the threshold, to a plurality of state patterns.

Example 49 may include the subject matter of any of Examples 47-48, and may further include means for identifying a match between the one or more data values included in the sensor based data set belonging to the first class to a particular state pattern from among the plurality of state patterns, the particular state pattern associated with the state.

Example 50 may include the subject matter of any of Examples 47-49, and may further include wherein the first class comprises data values of interest, the second class comprises data values not of interest, and the data values included in the first class are at least indicative of the one or more states of the device.

Example 51 may include the subject matter of any of Examples 47-50, and may further include wherein the first class includes data values indicative of an outlier state, data values indicative of a change state, data values indicative of a sub-component included in the device turning on or off, or data values indicative of a particular sub-component included in the device.

Example 52 may include the subject matter of any of Examples 47-51, and may further include wherein the sensor based data set comprises time series data or frequency series data based on Fourier transform of the time series data.

Example 53 may include the subject matter of any of Examples 47-52, and may further include wherein the device comprises a mechanical device, an electro-mechanical device, a heating device, a ventilating device, and air conditioning (HVAC) system, a compressor, a fan, a humidifier, a dehumidifier, a condenser, a freezer, a refrigerator, a refrigerant system, an air filtration system, a motor, a generator, a transformer, or a power source.

Example 54 may include the subject matter of any of Examples 47-53, and may further include wherein the means for analyzing the distribution of the sensor based data set to determine whether to constrain the sensor based data set comprises means for determining whether a standard deviation of top N data values of the sensor based data set is greater than a pre-set value M; when the standard deviation is determined to be greater than the pre-set value M, means for determining whether a difference between a mean of the top N data values and a mean of base noise of the sensor based data set is greater than a pre-determined value; and when the difference is determined to be greater than the pre-determined value, means for constraining magnitude of data values included in the sensor based data set to a mean of the top N data values.

Example 55 may include the subject matter of any of Examples 47-54, and may further include wherein the means for analyzing the distribution of the sensor based data set to determine whether to constrain the sensor based data set comprises, when the standard deviation is determined not to be greater than the pre-set value M, means for not constraining the sensor based data set.

Example 56 may include the subject matter of any of Examples 47-55, and may further include wherein the means for analyzing the distribution of the sensor based data set to determine whether to constrain the sensor based data set comprises, when the difference is determined not to be greater than the pre-determined value, means for determining a second standard deviation of top N−1 data values of the sensor based data and determining whether a second difference between a mean of the top N−1 data values and the mean of base noise is greater than the pre-determined value, and, when the second difference is greater than the pre-determined value, means for constraining the magnitude of data values included in the sensor based data set to a mean of the top N−1 data values.

Example 57 may include the subject matter of any of Examples 47-56, and may further include wherein the pre-set value M comprises one standard deviation.

Example 58 may include the subject matter of any of Examples 47-57, and may further include wherein N comprises 20 or approximately 5 to 10% of a total number of data values of the sensor based data set.

Example 59 may include the subject matter of any of Examples 47-58, and may further include wherein the device is associated with one or more sensors, and the one or more sensors comprises a thermocouple, a temperature sensor, an accelerometer, a gyroscope, a barometric sensor, a motion sensor, an audio sensor, a visual sensor, a camera, an infrared sensor, a vibration sensor, a pressure sensor, a location sensor, a global positioning system (GPS), a radio detection and ranging (RADAR), a light radar (LIDAR), a photodetector, a current transformer, a voltmeter, or a power meter.

Example 60 may include the subject matter of any of Examples 47-59, and may further include wherein the apparatus comprises a server to service the device, and wherein the sensor based data set is associated with the device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

We claim:

1. An apparatus, comprising:
   one or more processors; and
   first and second modules to be executed by the one or more processors,
   the first module to selectively constrain a sensor based data set, wherein to selectively constrain the sensor based data set, the first module is to analyze a distribution of the sensor based data set to determine whether to constrain the sensor based data set, the sensor based data set associated with one or more states of a device and the sensor based data set including a first class and a second class of data values, and
   the second module to determine a threshold associated with the sensor based data set, wherein to determine the threshold, the second module is to select the threshold based on a variance between the first and second classes of the sensor based data set, wherein the second module is to select the threshold using a constrained sensor based data set when the first module determines that the sensor based data set is to be constrained, and wherein the threshold indicates the data values associated with the first and second classes.

2. The apparatus of claim 1, further comprising:
   one or more storage media to store a plurality of state patterns; and
   a third module to be executed by the one or more processors, the third module to identify a state of the device, wherein to identify the state of the device, the third module is to compare one or more data values included in the sensor based data set belonging to the first class in accordance with the threshold, to the plurality of state patterns.

3. The apparatus of claim 2, wherein the third module is to identify a match between the one or more data values included in the sensor based data set belonging to the first class to a particular state pattern from among the plurality of state patterns, the particular state pattern associated with the state.

4. The apparatus of claim 1, wherein the first class comprises data values of interest, the second class comprises data values not of interest, and the data values included in the first class are at least indicative of the one or more states of the device.

5. The apparatus of claim 1, wherein the first class includes data values indicative of an outlier state, data values indicative of a change state, data values indicative of a sub-component included in the device turning on or off, or data values indicative of a particular sub-component included in the device.

6. The apparatus of claim 1, wherein the sensor based data set comprises time series data or frequency series data based on Fourier transform of the time series data.

7. The apparatus of claim 1, wherein the device comprises a mechanical device, an electro-mechanical device, a heating device, a ventilating device, and air conditioning (HVAC) system, a compressor, a fan, a humidifier, a dehumidifier, a condenser, a freezer, a refrigerator, a refrigerant system, an air filtration system, a motor, a generator, a transformer, or a power source.

8. The apparatus of claim 1, wherein the first module is to analyze the distribution of the sensor based data set to determine whether to constrain the sensor based data set comprises:
   to determine whether a standard deviation of top N data values of the sensor based data set is greater than a pre-set value M;

when the standard deviation is determined to be greater than the pre-set value M, to determine whether a difference between a mean of the top N data values and a mean of base noise of the sensor based data set is greater than a pre-determined value; and when the difference is determined to be greater than the pre-determined value, to constrain a magnitude of data values included in the sensor based data set to a mean of the top N data values.

9. The apparatus of claim 8, wherein the first module is to analyze the distribution of the sensor based data set to determine whether to constrain the sensor based data set comprises:

when the standard deviation is determined not to be greater than the pre-set value M, to not constrain the sensor based data set.

10. The apparatus of claim 8, wherein the first module is to analyze the distribution of the sensor based data set to determine whether to constrain the sensor based data set comprises:

when the difference is determined not to be greater than the pre-determined value, to determine a second standard deviation of top N−1 data values of the sensor based data set and determine whether a second difference between a mean of the top N−1 data values and the mean of base noise is greater than the pre-determined value, and when the second difference is greater than the pre-determined value, to constrain the magnitude of data values included in the sensor based data set to a mean of the top N−1 data values.

11. A computer-implemented method, comprising:

selectively constraining a sensor based data set associated with one or more states of a device, wherein selectively constraining the sensor based data set includes analyzing a distribution of the sensor based data set to determine whether to constrain the sensor based data set, the sensor based data set including a first class and a second class of data values; and determining a threshold associated with the sensor based data set, wherein determining the threshold includes selecting the threshold based on a variance between the first and second classes of the sensor based data set, wherein selecting the threshold includes using a constrained sensor based data set when the sensor based data set is determined to be constrained, and wherein the threshold indicates the data values associated with the first and second classes.

12. The method of claim 11, further comprising identifying a state of the device, wherein identifying the state of the device includes comparing one or more data values included in the sensor based data set belonging to the first class in accordance with the threshold, to a plurality of state patterns.

13. The method of claim 12, further comprising identifying a match between the one or more data values included in the sensor based data set belonging to the first class to a particular state pattern from among the plurality of state patterns, the particular state pattern associated with the state.

14. The method of claim 11, wherein the first class comprises data values of interest, the second class comprises data values not of interest, and the data values included in the first class are at least indicative of the one or more states of the device.

15. The method of claim 11, wherein analyzing the distribution of the sensor based data set to determine whether to constrain the sensor based data set comprises:

determining whether a standard deviation of top N data values of the sensor based data set is greater than a pre-set value M;

when the standard deviation is determined to be greater than the pre-set value M, determining whether a difference between a mean of the top N data values and a mean of base noise of the sensor based data set is greater than a pre-determined value; and when the difference is determined to be greater than the pre-determined value, constraining a magnitude of data values included in the sensor based data set to a mean of the top N data values.

16. One or more non-transitory computer-readable storage medium (NTCRSM) comprising a plurality of instructions to cause an apparatus, in response to execution by one or more processors of the apparatus, to:

selectively constrain a sensor based data set associated with one or more states of a device, wherein to selectively constrain the sensor based data set includes to analyze a distribution of the sensor based data set to determine whether to constrain the sensor based data set, the sensor based data set including a first class and a second class of data values; and determine a threshold associated with the sensor based data set, wherein to determine the threshold includes to select the threshold based on a variance between the first and second classes of the sensor based data set, wherein to select the threshold includes using a constrained sensor based data set when the sensor based data set is determined to be constrained, and wherein the threshold indicates the data values associated with the first and second classes.

17. The NTCRSM of claim 16, wherein the sensor based data set comprises time series data or frequency series data based on Fourier transform of the time series data.

18. The NTCRSM of claim 16, wherein to analyze the distribution of the sensor based data set to determine whether to constrain the sensor based data set comprises to:

determine whether a standard deviation of top N data values of the sensor based data set is greater than a pre-set value M;

when the standard deviation is determined to be greater than the pre-set value M, determine whether a difference between a mean of the top N data values and a mean of base noise of the sensor based data set is greater than a pre-determined value; and when the difference is determined to be greater than the pre-determined value, constrain a magnitude of data values included in the sensor based data set to a mean of the top N data values.

19. The NTCRSM of claim 18, wherein to analyze the distribution of the sensor based data set to determine whether to constrain the sensor based data set comprises to:

when the difference is determined not to be greater than the pre-determined value, determine a second standard deviation of top N−1 data values of the sensor based data set and determine whether a second difference between a mean of the top N−1 data values and the mean of base noise is greater than the pre-determined value, and when the second difference is greater than the pre-determined value, constrain the magnitude of data values included in the sensor based data set to a mean of the top N−1 data values.

20. The NTCRSM of claim 18, wherein N comprises 20 or approximately 5 to 10% of a total number of data values of the sensor based data set.

21. An apparatus, comprising:
interface circuitry; and
processor circuitry communicatively coupled with memory circuitry, wherein the processor circuitry is arranged to:
selectively constrain a sensor based data set associated with one or more states of a device, and including analysis of a distribution of the sensor based data set to determine whether to constrain the sensor based data set, the sensor based data set including a first class and a second class of data values;
determine a threshold associated with the sensor based data set; and
select the threshold based on a variance between the first and second classes of the sensor based data set when the sensor based data set is determined to be constrained, and wherein the threshold indicates the data values associated with the first and second classes.

22. The apparatus of claim 21, wherein the processor circuitry is further arranged to identify a state of the device based on a comparison of one or more data values included in the sensor based data set belonging to the first class in accordance with the threshold, to a plurality of state patterns.

23. The apparatus of claim 21, wherein the first class includes data values indicative of an outlier state, data values indicative of a change state, data values indicative of a sub-component included in the device turning on or off, or data values indicative of a particular sub-component included in the device.

24. The apparatus of claim 21, wherein the device is associated with one or more sensors, and the one or more sensors comprises a thermocouple, a temperature sensor, an accelerometer, a gyroscope, a barometric sensor, a motion sensor, an audio sensor, a visual sensor, a camera, an infrared sensor, a vibration sensor, a pressure sensor, a location sensor, a global positioning system (GPS), a radio detection and ranging (RADAR), a light radar (LIDAR), a photodetector, a current transformer, a voltmeter, or a power meter.

25. The apparatus of claim 21, wherein the apparatus comprises a server to service the device, and wherein the sensor based data set is associated with the device.

* * * * *